United States Patent [19]
Kanamoto et al.

[11] Patent Number: 4,912,719
[45] Date of Patent: Mar. 27, 1990

[54] ION LASER TUBE

[75] Inventors: Takashi Kanamoto; Kazuhisa Nishida, both of Tokyo, Japan

[73] Assignee: NEC Corporation, Tokyo, Japan

[21] Appl. No.: 126,566

[22] Filed: Nov. 30, 1987

[51] Int. Cl.[4] .................. H01S 3/03

[52] U.S. Cl. .................. 372/61; 372/62; 372/63

[58] Field of Search .................. 372/61, 62, 63

[56] References Cited

U.S. PATENT DOCUMENTS 4,734,915 3/1988 Mefferd et al. .................. 372/61

*Primary Examiner*—William L. Sikes

*Assistant Examiner*—Georgia Y. Epps

*Attorney, Agent, or Firm*—Helfgott & Karas

[57] ABSTRACT

The discharge section of an ion laser tube is made up of a plurality of axially spaced pillar members, each accommodating and holding a respective capillary tube within a central hole, the capillary tubes defining the discharge path. The pillar members are made of high thermal conductivity material, such as aluminum nitride, while the capillary tuves are made of a material, such as silicon carbide, having a high durability under plasma bombardment. The gap between adjacent capillary tubes is preferably equal to or less than the inner diameter of the capillary tubes.

7 Claims, 2 Drawing Sheets

ION LASER TUBE

BACKGROUND OF THE INVENTION

The present invention relates to an ion laser tube, and more specifically to a structure of a discharge path within an elongated airtight envelope.

In an ion laser tube, laser oscillation is caused by energy transition owing to ionization of a gaseous active medium such as argon and krypton. In order to obtain a higher output power, ion density should be increased. To this end, it is necessary to supply a large electric current of more than ten amperes in a narrow discharge path having an inner diameter of 1 to 4 mm.

However, oscillation efficiency of the ion laser tube is low. Namely, most of applied electric energy is converted to heat, and thus the discharge path member or laser capillary reaches an extremely high temperature. Therefore, the material for forming the laser capillary requires high durability to the high temperature plasma.

Furthermore, the large amount of heat will cause a deformation of a laser tube so that the optical quality of the generated laser beam is greatly deteriorated. In addition, if the deformation of the laser tube becomes too great, the laser tube itself will often be broken.

Therefore, it has been an ordinary practice to provide a cooling mechanism to the laser tube. In such laser tube provided with a cooling mechanism, the envelope and the laser capillary require high thermal conductivity in addition high durability to plasma.

According to our research, we have found that aluminum nitride (AlN) is superior to previously used material such as graphite, tungsten and beryllia from the viewpoint of satisfying all conditions of high thermal conductivity, high durability to plasma, ease of processing and fabricating that dominates the cost, and steady procurement. However, when AlN is used to form the laser capillary, the sputtering by plasma bombardment resolves the AlN capillary to produce nitrogen gas. The discharge condition of the laser tube is affected by the nitrogen gas and output power becomes unstable. Eventually, the termination of the discharge will occur.

SUMMARY OF THE INVENTION

Accordingly, it is an object of the present invention to provide an ion laser tube free from the above mentioned difficulties and disadvantages.

Another object of the present invention is to provide an ion laser tube which an be easily fabricated which requires only readily procurable materials.

According to the present invention, the discharge section of an elongated airtight envelope comprises a plurality of ceramic pillar members each accommodating a respective capillary tube within a central through hole. The pillar members are made of such material as aluminum nitride which has a high thermal conductivity while the capillary tubes are made of such material as silicon carbide which has a good durability against plasma bombardment.

According to one embodiment of the present invention, there is provided an ion laser tube comprising an elongated airtight envelope for containing a laser active gaseous medium therein, a pair of Brewster plates provided at end portions of the envelope for passing a laser light therethrough, together with an anode electrode and cathode electrode located in the end portions of the envelope to provide an electric discharge therebetween within the envelope. A plurality of capillary tubes of silicon carbide are arranged along a laser axis of the ion laser tube between the anode electrode and cathode electrode, and a plurality of tubular members of aluminum nitride are likewise arranged along said laser axis, each of the tubular members having a first central hole for accomodating and holding each capillary tube and a plurality of second through holes surrounding the first central hole. The tubular members are air-tightly secured to each other in such a manner that the capillary tubes which they hold are spaced apart from each other while the outer surfaces of the tubular members form a part of side surface of the envelope. In accord with a further aspect of the invention, each of the tubular members has a projection of one end and a dent at the other end so that adjacent tubular members are coupled to each other in such manner that the projection of one tubular member is inserted into the dent of a succeeding tubular member and thereby determines the straight alignment of the tubular members.

The above and other objects, features and advantages of the present invention will be apparent from the following description of preferred embodiments of the invention with reference to the accompanying drawings.

DESCRIPTION OF THE PREFERRED EMBODIMENTS

Figure 1:
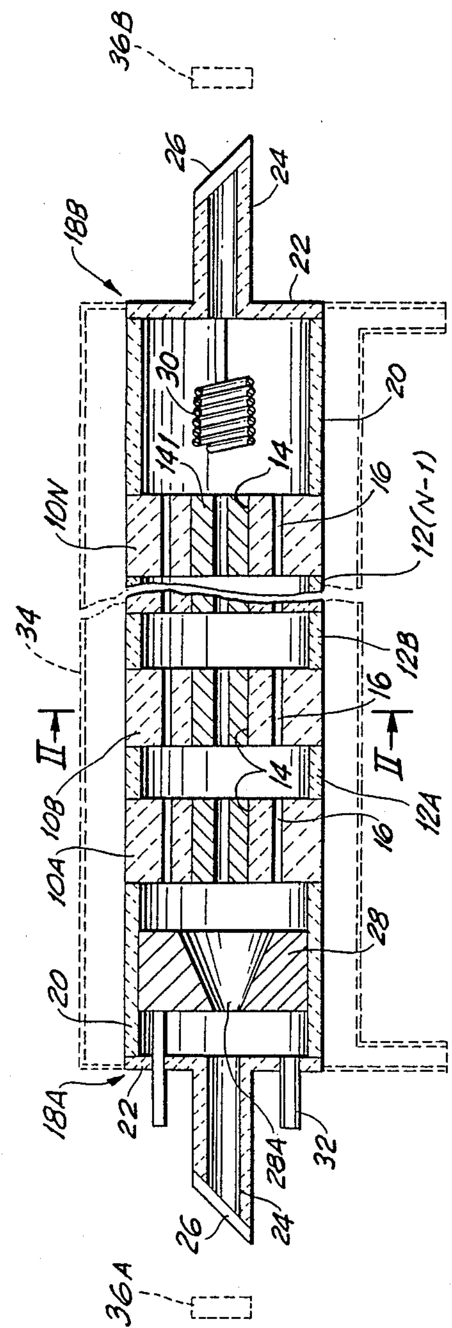
FIG. 1 is a longitudinal section view of one example of the external mirror type ion laser tube according to the first embodiment of the present invention.
Figure 2:
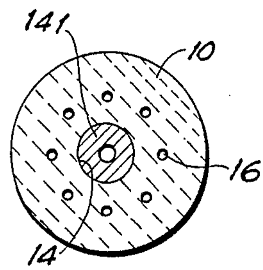
FIG. 2 is a sectional view taken along the line II—II in FIG. 1.

Referring to FIG. 1, a discharge section of the elongated airtight envelope comprises a plurality of AlN pillar members 10A, 10B, . . . ION and a plurality of AlN cylindrical spacer members 12A, 12B, . . . 12 (n-1) which are alternately and coaxially arranged along a capillary axis of the ion laser tube. These members 10 and 12 have the same outer diameter, and each of the pillar members 10 has a central through hole 14 dimensioned to accommodate and hold a SiC capillary tube 141. In addition, each pillar member 10 has a plurality of second through holes 16 formed at the same angular intervals to surround the central hole 14 as shown in FIG. 2. These second holes 16 are positioned inside the spacer member 12 so as not to be covered by the spacer member 12. The pillar member 10 and the spacer member 12 are air-tightly secured to each other by glass solder in such a manner that the capillary tubes 141 in the respective pillar members 10 are aligned to form a straight discharge path called a laser capillary, and each second hole 16 of each pillar member functions as a gas return path.

To opposite ends of the series-secured pillar members 10 and spacer members 12 as mentioned above, a pair of ceramic end caps 18A and 18B are fixed, respectively, for example by glass solder. Each of the end caps 18A and 18B includes a cylindrical end member 20 secured at its one end to the adjacent pillar member 10A or 10N. An end plate 22 is secured to the other end of each cylindrical end member 20. A tubular member 24 extends outwardly from a center portion of each end plate 22. Further, a Brewster plate 26 is secured to a tip end of each tubular member 24 at an angle inclined to the laser capillary axis. The Brewster plate 26 is made of for example silica glass.

Thus, a vacuum envelope is formed by the pillar member 10, the spacer member 12 and the end caps 18. An anode electrode 28 is located in a space defined by the end cap 18A and the pillar member 10A coupled thereto. Anode electrode 28 is formed of a metal disc which has a central through hole 28A in alignment with the central holes 14 of the pillar members 10. In addition, the through hole 28A is in the form of a circular cone flared toward the adjacent disc member 10A. At the other end, the cathode electrode 30 is in the form of a spiral coil having a center core space in alignment with the central holes 14 of the pillar member 10. Furthermore, the end cap 18A for accommodating the anode electrode 28 has a metal tube 32 for exhausting gas from the envelope and for charging a laser active gas to the envelope.

The laser tube constructed as mentioned above is covered by a water jacket 34 shown in dotted lines in FIG. 1, so that the cylindrical envelope is cooled by water circulated through the water jacket 34. In addition, a pair of mirrors 36A and 36B are located at opposite ends in alignment with the capillary axis to put the laser tube therebetween.

According to the foregoing embodiment, since the SiC capillary tube is accommodated within a through hole of AlN pillar member, the direct sputtering of the plasma bombardment onto the AlN members is suppressed. Thus the generation of the nitrogen gas due to plasma bombardment is prevented.

Figure 3:
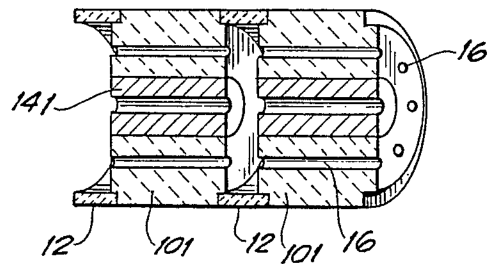
FIG. 3 is a perspective-sectional view of the intermediate section of the laser tube in accordance with the second embodiment of the present invention.

Turning to FIG. 3, there is shown a modification of the pillar member 10 in FIG. 1. The modified pillar member 101 has a pair of projections on opposed end surfaces so as to be inserted into the adjacent spacer member 12. When the pillar members 10 in FIG. 1 are replaced by the modified pillar members 101, the alignment process becomes easy.

Figure 4:
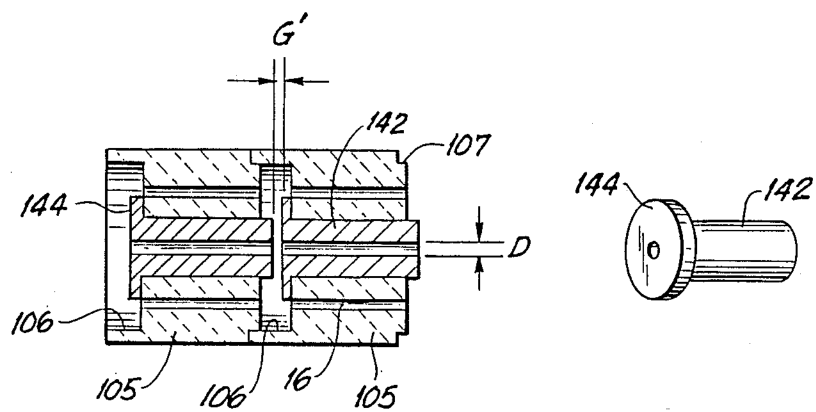
FIG. 4 is a longitudinal sectional view of another modified intermediate section of the laser tube according to the third embodiment of the present invention.
Figure 5:
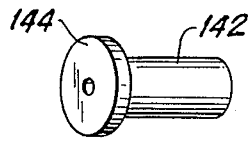
FIG. 5 is a perspective view of the capillary tube shown in FIG. 4.

Referring to FIG. 4, there is shown a further embodiment of the invention with a further modification of the pillar member 10 to make the fabrication process easier than the case shown in FIG. 3. In this embodiment, each pillar member 105 has a combined structure of the pillar member 10 and the spacer member 12 of FIG. 3. In FIG. 4, furthermore, each capillary tube 142 is also modified such that a flange 144 is provided at one end and the other end thereof is projected from the end surface of the pillar member 105. The diameter of the flange 144 is selected so as not to cover the second holes 16. The axial length of the capillary tube 142 is chosen so as not to contact to an adjacent capillary tube. Preferably, the gap G between adjacent capillary tubes 142 is selected to be equal to or less than the inner diameter D of the capillary tube 142. When this condition is met, sputtering by plasma bombardment at edge portions of the capillary tubes can be suppressed due to suppression of plasma spread at the gap G. In addition, the condition of $G \leqq D$ restrains the decrease of laser gas owing to the sputtering compared with the case of $G > D$ and thereby remarkably elongates the lifetime of the laser tube.

From a practical point in view of fabricating the discharge tube, the gap G is selected to be 0.5 mm. or more in order to avoid an electrical contact between the adjacent capillary tubes. Therefore, the condition of $0.5\ \text{mm} \leqq G \leqq d$ is preferably.

The flange 144 of the capillary tube helps to facilitate the alignment assembly of the discharge tube. The flange 144 determines the position of the capillary tube and the frit glass can be easily applied to fix the flange 144 to the pillar member without deteriorating the thermal conductivity by applying the frit glass so as not to enter into the through hole 14 of the pillar member.

According to the third embodiment, a plurality of pillar members 105 with capillary tubes 142 are laminated in series such that each projection region 106 is inserted into a dent region 107 of the adjacent pillar member. These simple coupling processes with small number of parts provide a straight discharge path automatically for a desired length.

The invention has thus been shown and described with reference to the specific embodiments. However, it should be noted that the invention is in no way limited to the details of the illustrated structures but changes and modifications may be made within the scope of the appended claims.

What is claimed is:

1. An ion laser tube comprising a plurality of insulative tubular members arranged along a laser axis of the ion laser tube; a plurality of capillary tubes, each of said tubular members having a through hole for accommodating and holding a respective capillary tube, each of said tubular members having a dent at one end and a projection at the other end such that adjacent tubular members are coupled to each other with said dent and projection fitting together, said tubular members consisting of a high thermal conductivity material and being air-tightly secured to each other so as to form a major part of an elongated air-tight envelope for containing a laser active gaseous medium therein, said envelope having end portions, said capillary tubes consisting of a material having a high durability to plasma bombardment and being spaced apart from each other; and an anode electrode and a cathode electrode positioned in said end portions of said envelope for providing an electric discharge therebetween within said envelope.

2. The ion laser tube claimed in claim 1, wherein the tubular members are made of aluminum nitride while the capillary tubes are made of silicon carbide.

3. The ion laser tube as claimed in claim 1, wherein each capillary tube has a flange at one end.

4. The ion laser tube as claimed in claim 1, wherein the spacing between adjacent capillary tubes is equal to or less than the inner diameter of the capillary tubes.

5. An ion laser tube comprising a plurality of tubular members of aluminum nitride arranged along a first axis, each of said tubular members having a first through hole and a plurality of second through holes surrounding said first through hole, said tubular members being air-tightly secured to each other in such a manner that peripheral surfaces of said tubular members form a major part of a peripheral surface of an elongated air-tight envelope for containing a laser active gaseous medium, each of said tubular members having a projection at one end and a dent at another end so that adjacent tubular members are coupled to each other in such manner that said projection of one tubular member is inserted into said dent of another tubular member to define a straight axial alignment of said tubular members with one another; a plurality of capillary tubes of silicon carbide each respectively held in said first through hole of each of said tubular members along said first axis, a pair of Brewster plates provided at end portions of said envelope for passing a laser light therethrough; and an anode electrode and a cathode electrode located in said end portions of said envelope for providing an electric discharge therebetween within said envelope.

6. The ion laser tube claimed in claim 5 wherein each of said capillary tubes has a flange at one end, and a spacing between adjacent capillary tubes is at most equal to an inner diameter of each of said capillary tubes.

7. An ion laser tube comprising a plurality of insulative tubular members arranged along a laser axis of the ion laser tube; a plurality of capillary tubes, each of said tubular members a having a through hole for accommodating and holding a respective capillary tube extending along said laser axis, said tubular members being made of aluminum nitride and being air-tightly secured to each other so as to form a major part of an elongated air-tight envelope for containing a laser active gaseous medium therein, said envelope having end portions, said capillary tubes being made of silicon carbide and being spaced apart from each other; and an anode electrode and a cathode electrode positioned in said end portions of said envelope for providing an electric discharge therebtween within said envelope.

* * * * *

UNITED STATES PATENT AND TRADEMARK OFFICE
CERTIFICATE OF CORRECTION

PATENT NO. : 4,912,719

DATED : March 27, 1990

INVENTOR(S) : TAKAHASHI KANAMOTO and KAZUHISA NISHIDA

It is certified that error appears in the above-identified patent and that said Letters Patent is hereby corrected as shown below:

On the title page, add the following additional new material--

[30] Foreign Application Priority Data

Nov. 29, 1986 [JP] Japan ........ 285755/1986
Jan. 29, 1987 [JP] Japan ........ UM11753/1987

Signed and Sealed this

Eleventh Day of February, 1992

*Attest:*

HARRY F. MANBECK, JR.

*Attesting Officer* *Commissioner of Patents and Trademarks*